United States Patent [19]

Faup et al.

[11] Patent Number: 5,098,572

[45] Date of Patent: Mar. 24, 1992

[54] METHOD AND APPARATUS FOR INCREASING SLUDGE CONCENTRATION IN WATER PURIFICATION INSTALLATIONS

[75] Inventors: Gérard Faup, Versailles; Jean-Marc Audic, Paris, both of France

[73] Assignee: Lyonnaise des Eaux, Paris, France

[21] Appl. No.: 587,490

[22] Filed: Sep. 21, 1990

Related U.S. Application Data

[63] Continuation of Ser. No. 248,507, Sep. 23, 1988, abandoned.

[30] Foreign Application Priority Data

Sep. 24, 1987 [FR] France .................. 87 13180

[51] Int. Cl.$^5$ .............................................. C02F 3/30
[52] U.S. Cl. ............................... 210/605; 210/625; 210/630; 210/903; 210/906
[58] Field of Search ............ 210/605, 608, 625, 630, 210/903, 906, 195.3, 205, 221.2, 703, 723

[56] References Cited

U.S. PATENT DOCUMENTS

| | | | |
|---|---|---|---|
| 669,335 | 3/1901 | Behrend | 210/205 |
| 1,573,204 | 2/1926 | Tanner | 210/205 |
| 3,418,236 | 12/1968 | Mail | 210/205 |
| 4,160,724 | 7/1979 | Laughton | 210/605 |
| 4,173,531 | 11/1979 | Matsch et al. | 210/625 |
| 4,179,374 | 12/1979 | Savage et al. | 210/903 |
| 4,183,808 | 1/1980 | Drnevich | 210/625 |
| 4,271,026 | 6/1981 | Chen et al. | 210/605 |
| 4,315,821 | 2/1982 | Climenhage | 210/903 |
| 4,452,699 | 6/1984 | Suzuki et al. | 210/608 |
| 4,460,470 | 7/1984 | Reimann | 210/608 |
| 4,488,968 | 12/1984 | Hong et al. | 210/605 |
| 4,790,439 | 12/1988 | Suzuki et al. | 210/625 |

FOREIGN PATENT DOCUMENTS

| | | |
|---|---|---|
| 2454426 | 11/1974 | Fed. Rep. of Germany . |
| 2918950 | 11/1980 | Fed. Rep. of Germany . |
| 2558819 | 1/1985 | France . |
| 148946 | 6/1981 | German Democratic Rep. . |
| 56-65693 | 6/1981 | Japan . |
| 6190795 | 12/1984 | Japan . |
| 1408600 | 1/1975 | United Kingdom . |

OTHER PUBLICATIONS

Degremont, *Memento Technique De L'Eau*, 1972, pp. 321–323.
Abwassertechnische Vereinigung, *Lehr-und Handbuch der Abwassertechnik*, p. 237.

*Primary Examiner*—Stanley S. Silverman
*Assistant Examiner*—Christopher Upton
*Attorney, Agent, or Firm*—Browdy and Neimark

[57] ABSTRACT

A method of treating water with activated sludge, comprising a process for depolluting said water including a stage in which carbon pollution is oxidized, a nitrification stage which may optionally be associated with a denitrification state and/or a dephosphating stage, and a sludge ageing process. The method further includes a sludge concentration stage, said stage being performed upstream from the sludge ageing stage, said concentration being performed by phase separation using compressed air, e.g. in a flotation tank (3), and the concentrated sludge being recycled via the sludge ageing stage.

6 Claims, 5 Drawing Sheets

METHOD AND APPARATUS FOR INCREASING SLUDGE CONCENTRATION IN WATER PURIFICATION INSTALLATIONS

This application is a continuation of application Ser. No. 07/248,507, filed Sept. 23, 1988, now abandoned.

BACKGROUND OF THE INVENTION

The present invention relates to a method and to apparatus for biological purification of waste water, of the type in which activated sludge (i.e. a bacteria culture dispersed in the form of flakes) is caused to develop in water treatment tanks, and in which, after a sufficient period of contact, the purified water is separated from the sludge by sedimentation (in a clarifier), with the sludge being recycled in one of the treatment tanks in order to maintain a sufficient concentration of purifying bacteria therein, while the surplus, excess secondary sludge, is removed from the system. This type of purification method seeks both to eliminate organic carbon pollution by oxidation using (free or bonded) oxygen dissolved in the water, and also to eliminate nitrogen pollution in all its forms (proteins, amino acids, urea and decomposition products, and nitrogen in inorganic form, in particular ammonia salts) by nitrification or by nitrification-denitrification, with nitrate reduction taking place prior to nitrification.

It has been observed that in purification methods making use of activated sludge, the limiting factor for nitrification is not the kinetics of the transformation of $NH_4$ into $NO_3$ (or of organic N into $NO_3$) but rather the age of the sludge, i.e. the actual time the sludge stays in the system. The limiting age is the age that needs to be adopted in order to conserve the nitrogen-fixing microorganisms in the purification station, and this is known to be very high because of the very long regeneration time of nitrogen-fixing microorganisms; as a result, it is necessary to provide very large volume aeration tanks which are over-dimensioned relative to reaction kinetics.

Several solutions have been proposed for diminishing these volumes:

One proposal, for example, has been to increase the concentration of the biomass being aerated: if the age of the sludge is written A, the volume being aerated V, the average concentration of the biomass X, and the daily production of excess sludge $\Delta X$, then the following equation can be written:

$$A = VX/\Delta X$$

Assuming that $\Delta X$ is constant, V can be made smaller by increasing X. However, in a conventional purification station, the upper limit for X is rapidly attained, since at a biomass concentration of more than 5-6 grams per liter (g/l), the capture ratio of the clarifier becomes too low to produce effluent of acceptable quality.

In order to obtain a further increase in the concentration of the biomass being aerated, a system has been proposed comprising two separate tanks: a "contact" tank in which ammonia is transformed into nitrates (nitrification); and a "stabilization" tank for increasing the age of the sludge. In this case, the contact tank has a concentration of material in suspension which is compatible with clarification for obtaining effluent of acceptable quality; as a result the stabilization tank can operate with sludge at a concentration higher than that in the contact tank, with said concentration being equal to the concentration of the recycled sludge. The concentration of recycled sludge is directly related to the recycling fraction. If the commonly-adopted recycling fraction of 100% of the raw water throughput is assumed, then a recycled sludge concentration is obtained which is equal to twice the concentration of the sludge in the contact basin, i.e. about 10 g/l. However, this increase in sludge concentration in the stabilization tank is nevertheless not very much greater than the maximum concentration which can be used in a conventional purification station.

The reaction tank, or contact tank, is a tank in which the depollution reaction occur.

The generation tank, also known as the stabilization tank, is a tank in which the sludge ageing stage takes place.

The initiation tank is the tank in which the initiation stage of the reactions occurs, particularly dephosphatation, the these reactions being effectively realized in the reaction tank.

The biological reactions taking place in water treatment can be characterized by two magnitudes:

R which represents substrat degradation kinetics; and
$\mu$ which represents microorganism growth rate under the conditions prevailing in the station.

It is also possible to characterize the volumes of the reaction tank and the generator tank by various parameters. For the reaction tank, and using the following symbols:

Q = flow rate of the effluent to be treated;
C = concentration of pollution to be eliminated (kg per $m^3$);
R = specific pollution degradation rate (kg per kg of matter in suspension (MeS) per day); and
Xr = microorganism concentration in the reaction tank (kg of the MeS per $m^3$);

then the volume Vr of said tank can be obtained from the following equation:

$$Vr = CQ/RXr$$

For the generator tank, and using the following variables:

$\mu$ = the microorganism growth rate;
$A = 1/\mu$ = the sludge age (in days) necessary for obtaining the reaction; and
Xg = micro-organism concentration in the generation tank (kg of MeS per $m^3$);

by definition, $\mu = (1/X)(dX/dt)$, where X is sludge concentration in kg of MeS per $m^3$ at the inlet to the clarification works; which, under steady state conditions, becomes:

$$\mu = (1/X)(\Delta X/\Delta t),$$

giving a daily production Px of sludge equal to:

$$Px = V(\Delta X/\Delta t)$$

(where V represents the maximum volume of the reaction tank and the generator tank); in which case the following equation defining the age of the sludge can be written:

$$A = XgVg/Px \qquad (1)$$

from which the volume of the generation tank Vg can be deduced as follows:

$$Vg = APx/Xg$$

With microorganism generation taking place in this way in the reaction tank, the overall equation for the age of the sludge can be written as follows:

$$A = (XgVg + XrVr)/Px \quad (2)$$

The total volume of a water treatment system can thus be obtained by the following equation:

$$V \text{total} = Vg + Vr$$

Further, since items A (age of the sludge) and Px (daily sludge production) are defined by the pollution to be eliminated and by the quality of the effluent to be treated, the parameter which governs proper operation of the water treatment installation is the weight of sludge being aerated, which is given by multiplying V by X.

In a conventional system, said weight of sludge being aerated is, by definition, given by the following equation:

$$A = VX/Px, \text{ i.e. } VX = APx \quad (3)$$

(where VX corresponds to the weight of sludge, since V is the volume being aerated and X is the microorganism concentration in the tank).

Finally, from equation (2) above, the following equation can be written:

$$(XgVg + XrVr) = APx \quad (4)$$

and combining equations (3) and (4), the following equation can be written:

$$VX = VgXg + VrXr$$

It is consequently highly advantageous to be able to provide a method and apparatus capable of increasing the concentration of activated sludge in a water purification station, with the concentration obtained being substantially greater than the concentrations obtained by prior art methods, thereby making it possible to considerably reduce the volumes of the treatment tanks in such a station.

The present invention also seeks to provide a method and apparatus which are particularly suitable for eliminating carbon pollution and nitrogen pollution, and for biological dephosphating.

SUMMARY OF THE INVENTION

The present invention provides a method of treating water by means of activated sludge, comprising a process of depolluting said water including a stage in which carbon pollution is oxidized, a nitrification stage which may optionally be associated with a denitrification stage and/or a dephosphating stage, and a sludge ageing process, wherein said method includes a sludge concentration stage, said stage being performed upstream from the sludge ageing stage, in that said concentration being performed by phase separation using compressed air, and the concentrated sludge being recycled via the sludge ageing stage.

In a particularly advantageous implementation of the method of the present invention, including a nitrification stage, the depollution process takes place under aerobic conditions.

In a particularly advantageous implementation of the method of the present invention, including a nitrification stage associated with a denitrification stage, the depollution process takes place successively under anaerobic conditions for the denitrification stage and then under aerobic conditions for the nitrification stage.

In a particularly advantageous implementation of the method of the present invention, including a dephosphating stage, the depollution process takes place under strict anaerobiosis conditions for the dephosphating stage, and under aerobic conditions for the carbon depollution reactions.

In a particularly advantageous implementation of the method of the present invention, including a dephosphating stage associated with a nitrification stage, the depollution process takes place under conditions of strict anaerobiosis for the dephosphating stage and under aerobic conditions for the nitrification stage and for the carbon depollution reactions.

In a particularly advantageous implementation of the method of the present invention, including a nitrification stage associated with a denitrification stage and/or a dephosphating stage, the depollution process takes place successively under conditions of strict anaerobiosis for the dephosphating stage, under anaerobic conditions for the denitrification stage, and under aerobic conditions for the nitrification stage and for the carbon depollution reactions.

In another advantageous implementation of the method of the present invention, the sludge concentration stage is performed by implementing the flotation technique.

In an advantageous disposition of this implementation, the flotation is performed directly or indirectly pressurizing the water to be treated, using compressed air.

In another advantageous disposition of this implementation, the concentrated sludge phase is recycled in an initiation stage taking place under conditions of strict anaerobiosis, in which the oxygen in said sludge is consumed.

In an implementation of the method of the present invention including a nitrification stage optionally associated with a denitrification stage, at least one generation stage takes place under aerobic conditions.

In an advantageous disposition of this implementation, for application to the nitrification stage, the concentrated sludge of the generation stage is recycled directly into at one least depollution process.

In another advantageous disposition of this implementation, for application to the denitrification stage associated with the nitrification stage, prior to being recycled in at least one depollution process, the concentrated sludge of the generation stage is diluted by being mixed with raw water under conditions of anoxia under which conditions the process of reducing nitrates to gaseous nitrogen takes place.

In another advantageous implementation including a dephosphating stage, the concentrated sludge initiated under conditions of strict anaerobiosis is injected into a quantity of raw water to be treated under anaerobic conditions, prior to being recycled in at least one depollution process.

The present invention also provides a water purifying installation including:

at least one tank in which carbon depollution reactions of the water to be treated take place; and at least one tank in which the sludge is aged and/or initiated in a manner suitable for enabling biological dephosphating to take place;

wherein the installation further includes at least one sludge concentration apparatus mounted in a loop between at least one reaction tank and at least one generator and/or initiator tank on the water treatment circuit.

In an advantageous embodiment of the apparatus of the present invention, the total volume of the water purification installation is given by the following equation:

$$V\text{total} = V - Vg(FC - 1)$$

in which:

$$V = APx/X,\ Vg = APx/Xg,\ \text{and}\ FC = (V - Vr)/Vg$$

where:

$$Vr = CQ/RXr\ \text{and}\ A = (XgVg + XrVr)/Px$$

with:
- $A$ = sludge age necessary for obtaining the reaction (in days);
- $Px$ = daily production of sludge (kg of MeS per day);
- $Xg$ = sludge concentration in the generator tank (kg of MeS per m$^3$);
- $Xr$ = sludge concentration in the reaction tank (kg of MeS per m$^3$);
- $X$ = sludge concentration at the inlet to the clarification equipment (kg of MeS per m$^3$);
- $Q$ = installation throughput;
- $C$ = concentration of pollution to be eliminated (kg per m$^3$); and
- $R$ = specific pollution degradation rate (kg per kg of MeS per day).

In an advantageous embodiment of the apparatus of the present invention, the means for concentrating said sludge is constituted by at least one flotation tank.

In an advantageous disposition of this embodiment, applied to nitrification and/or to denitrification, at least one flotation tank is associated with at least one generator tank operating under aerobic conditions.

In another advantageous disposition of this embodiment, applied to denitirification, at least one generator tank is associated with an anoxic zone placed at the inlet to the water purification station.

In yet another advantageous disposition of this embodiment, applied to dephosphating, applied to dephosphating, wherein at least one flotation tank is associated with at least one initiator tank operating under conditions of strict anaerobiosis, which initiator tank is connected to a tank operating under anaerobic conditions located at the inlet to the water purification station.

In another advantageous embodiment of the apparatus of the present invention, applied to nitrification and/or denitrification associated with dephosphating, at least one flotation tank is associated with at least one generator tank operating under aerobic conditions and with at least one initiator tank operating under anaerobic conditions.

In another advantageous embodiment of the apparatus of the present invention, applied to nitrification and/or denitrification associated with dephosphating, said apparatus comprises the combination of at least one flotation tank associated with at least one generator tank operating under aerobic conditions, with at least one flotation tank associated with at least one initiator tank operating under anaerobic conditions.

In an advantageous disposition of this embodiment, the generator and/or initiator tanks are fed in alternation with recycled concentrated sludge from the flotation tank.

In another advantageous disposition of this embodiment, the generator and initiator tanks are fed in alternation with concentrated recycled sludge from the flotation tank.

In an advantageous embodiment of the apparatus of the present invention, a flocculation vat is provided between the contact tank and the clarifier.

In an advantageous disposition of this embodiment, the flocculation vat is associated with at least one flotation tank.

BRIEF DESCRIPTION OF THE DRAWINGS

Embodiments of the invention are described by way of example with reference to the accompanying drawings, in which.

The additional description below also includes examples of implementations of the method of concentrating activated sludge in accordance with the present invention.

However, it should naturally be understood that the following examples and the accompanying drawings together with the corresponding portion of the description are given merely by way of illustrations of the subject matter of the invention and that they do not limit the invention in any way.

DETAILED DESCRIPTION OF THE INVENTION

Apparatus in accordance with the present invention includes at least one reaction tank 1 connected to a clarifier 2. At least one flotation tank 3 is mounted in a loop between at least one reaction tank 3 1 and at least one generator and/or initiator tank 4. In addition, there is a flocculation vat 5 between the reaction tank 1 and the clarifier 2.

Figure 1:
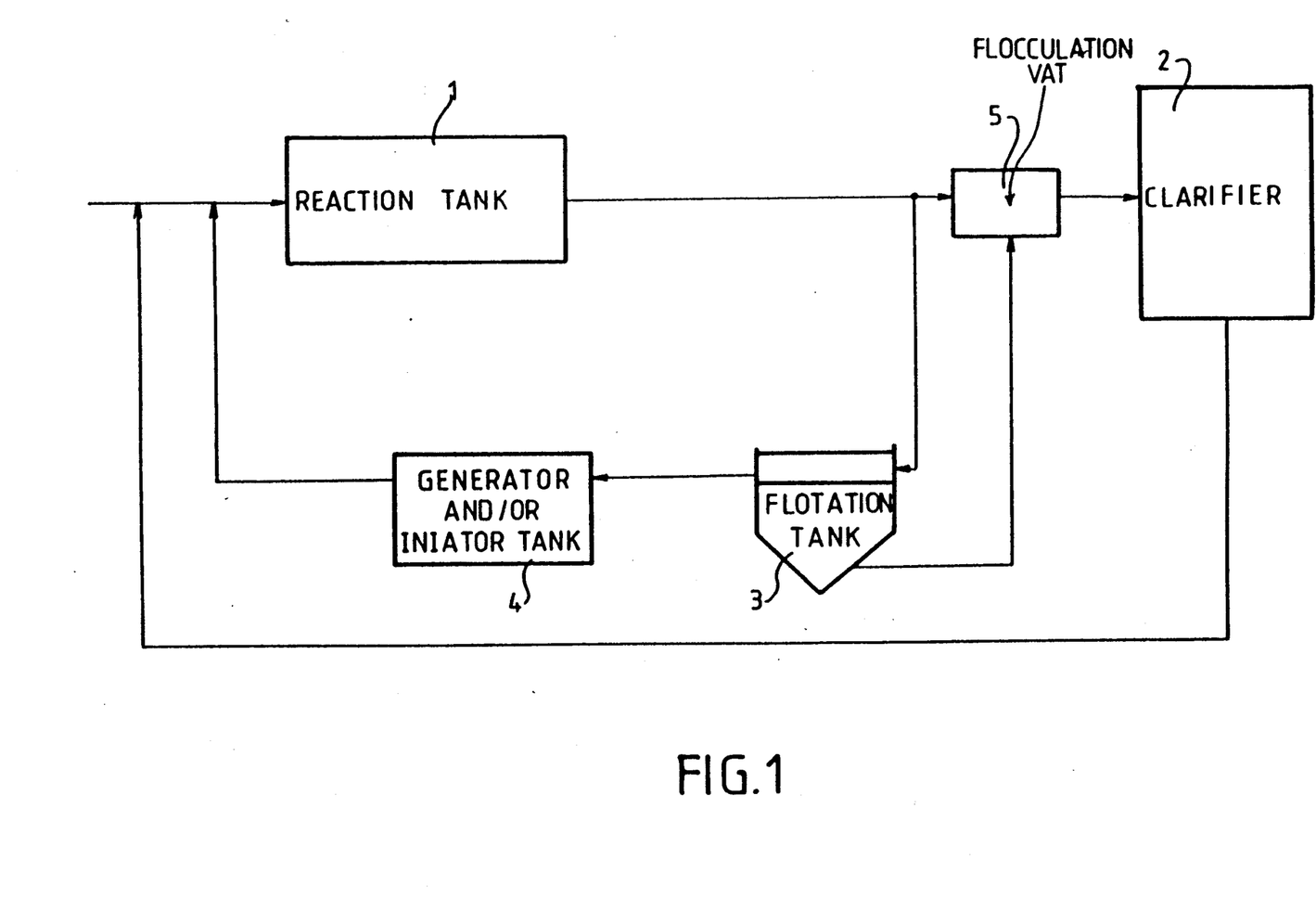
FIG. 1 is a diagram of a water purification station provided with apparatus in accordance with the invention for concentrating activated sludge and associated with a nitrification zone.

When the apparatus is applied to nitrification (FIG. 1) the concentrated sludge of the generator tank 4 is recycled directly into the reaction tank 1.

For denitrification (FIG. 2), it is necessary to insert an anoxic zone 6 at the inlet to the station, into which the concentrated sludge from the generator tank 4 is conveyed prior to being recycled in the reaction tank 1.

Figure 3:
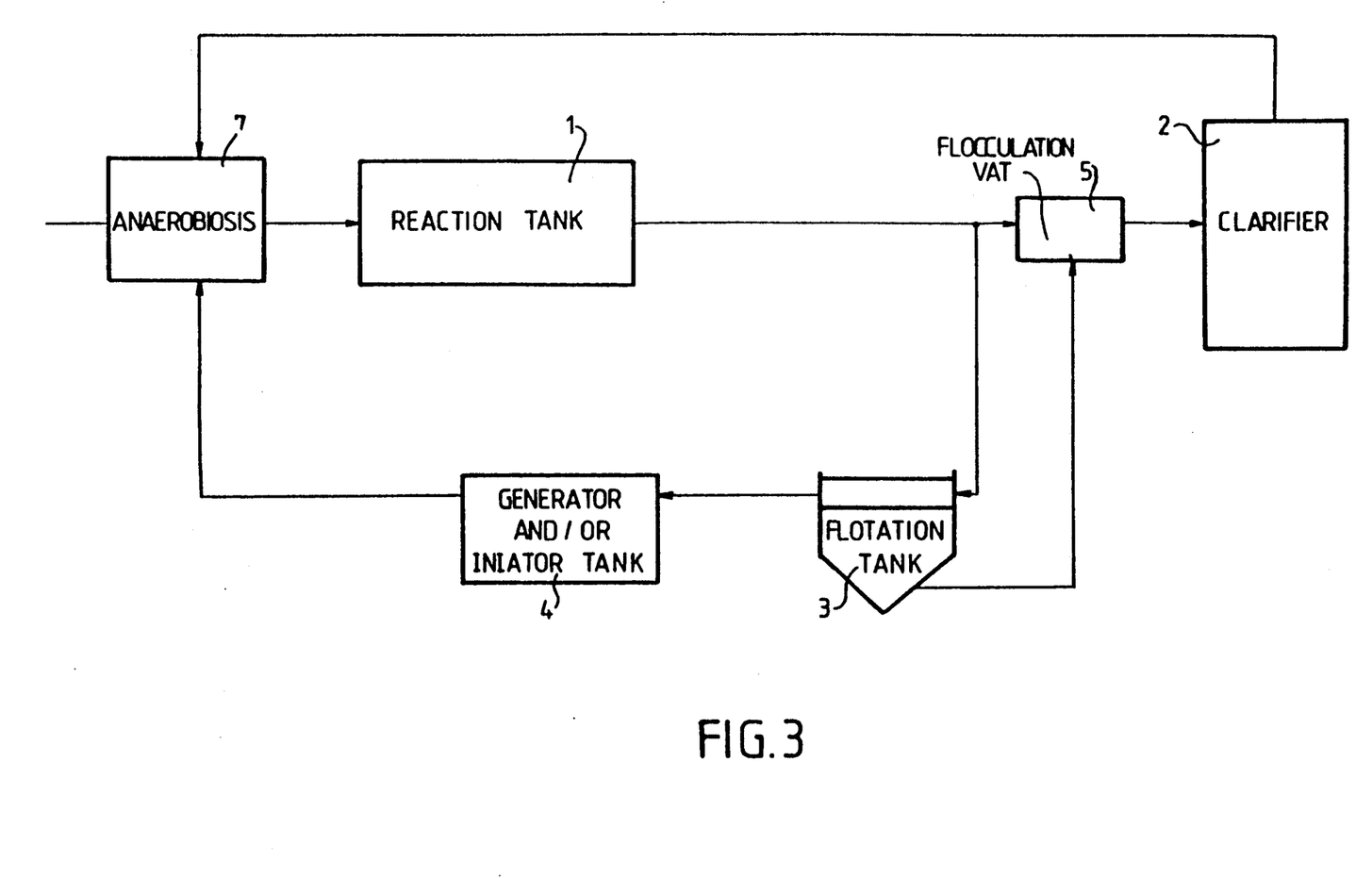
FIG. 3 is a diagram of an embodiment in which the apparatus of the invention is associated with a dephosphating zone.

Finally, for dephosphatizing (FIG. 3), the concentrated sludge from the initiator tank 4 is conveyed to a tank 7 which operates in anaerobiosis, prior to being recycled in the reaction tank 1.

Figure 4:
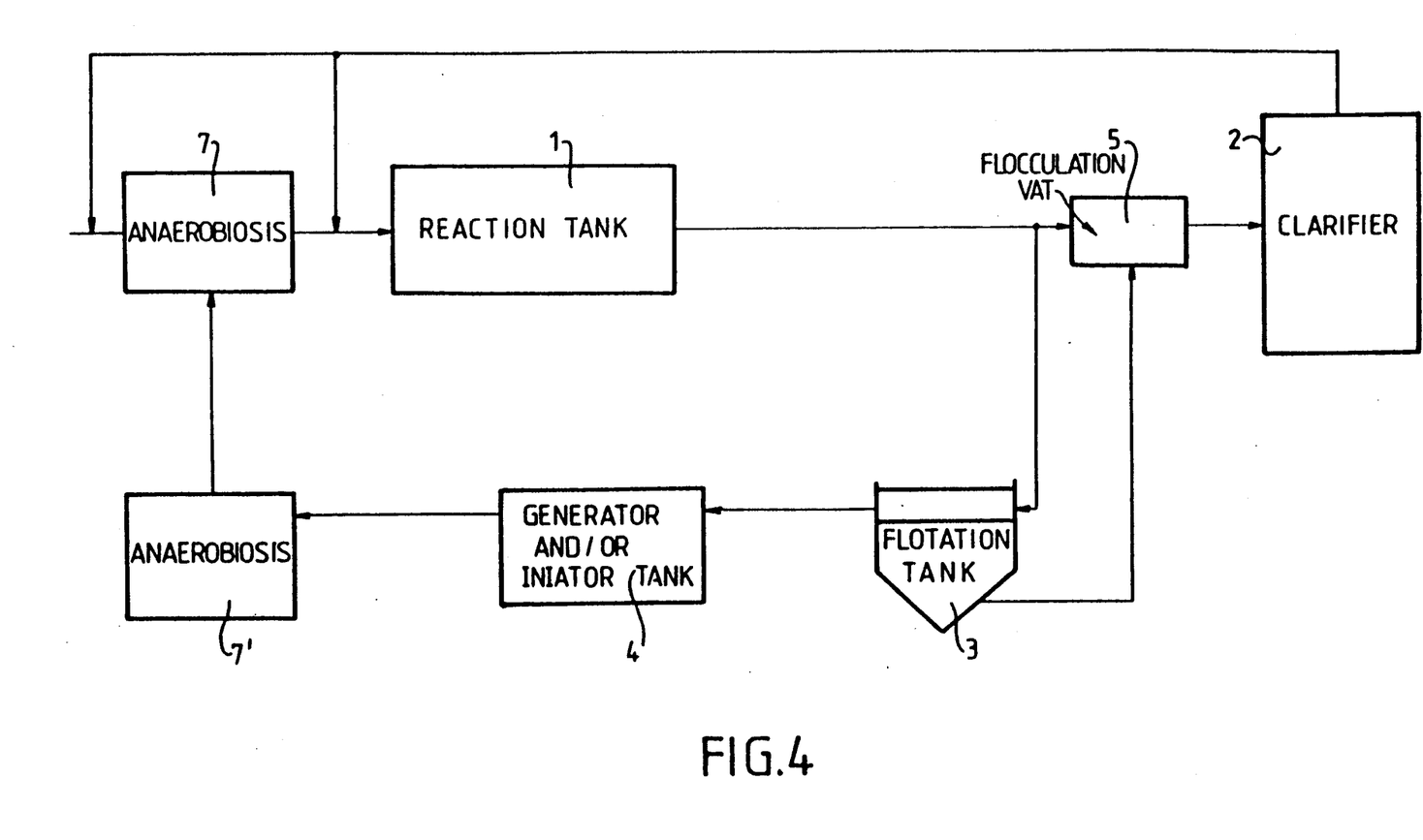
FIG. 4 is a diagram of an embodiment in which the apparatus of the invention is associated with a nitrification zone and with a dephosphating zone.

When apparatus in accordance with the invention is used for nitrification in association with dephosphating (FIG. 4), the generator and/or initiator tank 4 is associated with a first tank 7' operating in anaerobiosis, which, in turn, is connected to the tank 7.

Figure 5:
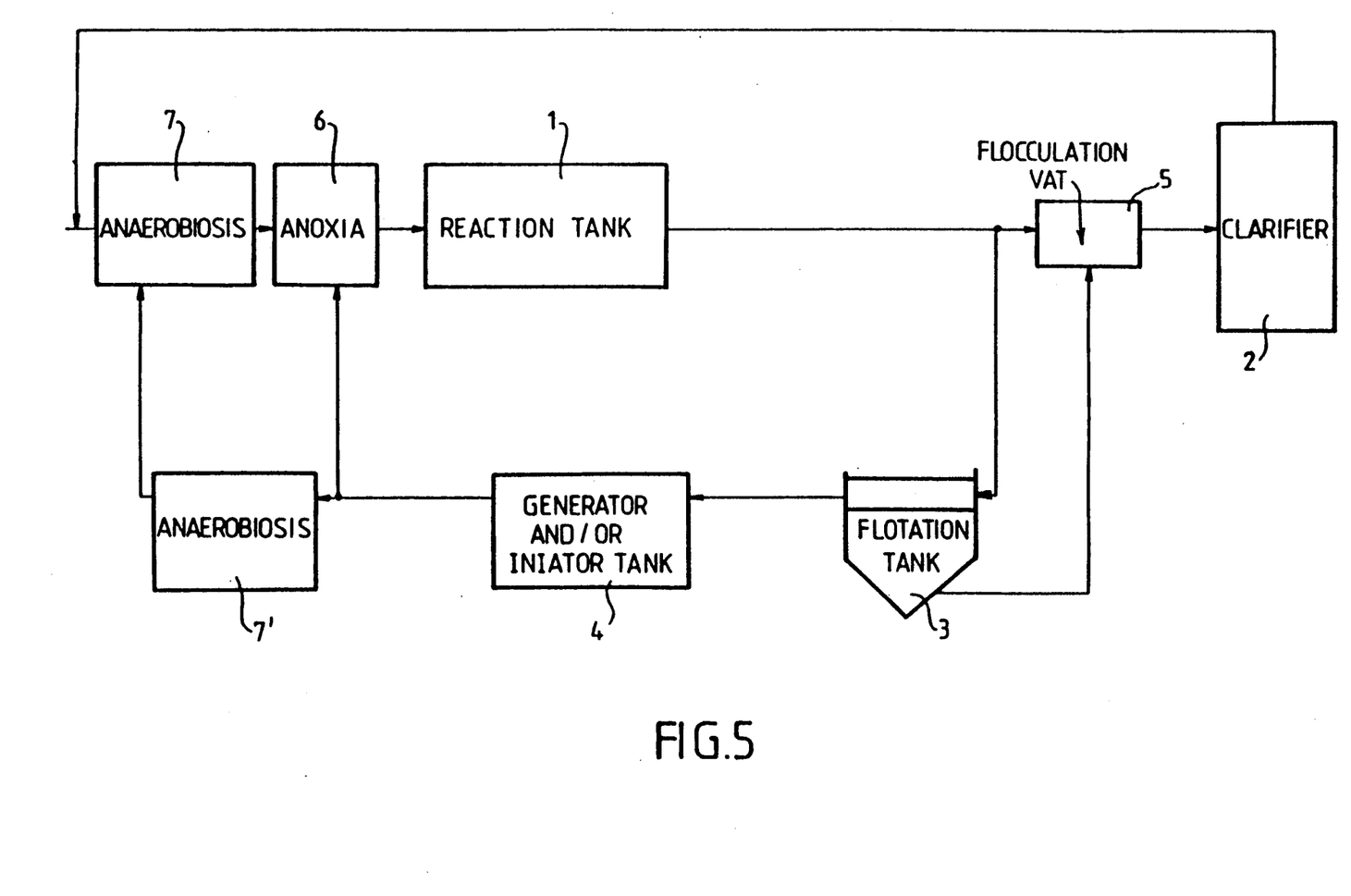
FIG. 5 is a diagram of an embodiment in which the apparatus of the invention is associated with a nitrification zone, with a denitrification zone, and with a dephosphating zone.

When nitrification is associated with denitrification and with dephosphating, the apparatus of the invention (FIG. 5) includes the generator and/or initiator tank 4 associated both with the anoxic zone 6 and with the tank 7' which is connected to the tank 7.

The operation of apparatus in accordance with the present invention, e.g. as applied to nitrification (FIG. 1), is as follows: raw water is directed to the reaction tank 1 which contains activated sludge, and bacteria are mixed in together with the quantity of oxygen required for said bacteria to proliferate in order to retain the organic pollution; the sludgy mixture is then sent to a clarifier 2 in order to separate the sludge from the purified water. When the concentration of sludge in the clarifier 2 is such that the clarifier capture rate (e.g. 5 g/l to 6 g/l) no longer provides effluent of sufficient quality, excess sludge from the tank 1 is then fed to at least one flotation tank for concentrating the sludge. The flotation tank 3 does not use a flotation agent, with flotation taking place by virtue of air being dissolved in the form of bubbles in the water to be treated; the water may be pressurized directly or indirectly to a pressure of about 4 bars to 5 bars. The sub-natant of the flotation tank 3, comprising effluent, is returned to the clarifier 2, via a flocculation vat 5. The supernatant from the flotation tank, comprising concentrated sludge, is sent to a generator tank 4 operating under aerobic conditions, after which the concentrated sludge is recycled to the reaction tank 1 in parallel with the sludge which has settled in the clarifier 2 and which is recycled to the same reaction tank.

When denitrification is associated with nitrification, apparatus in accordance with the invention (FIG. 2) operates in the same way as described above. The reaction tank, or contact tank, is a tank in which the depollution reaction occur.

Figure 2:
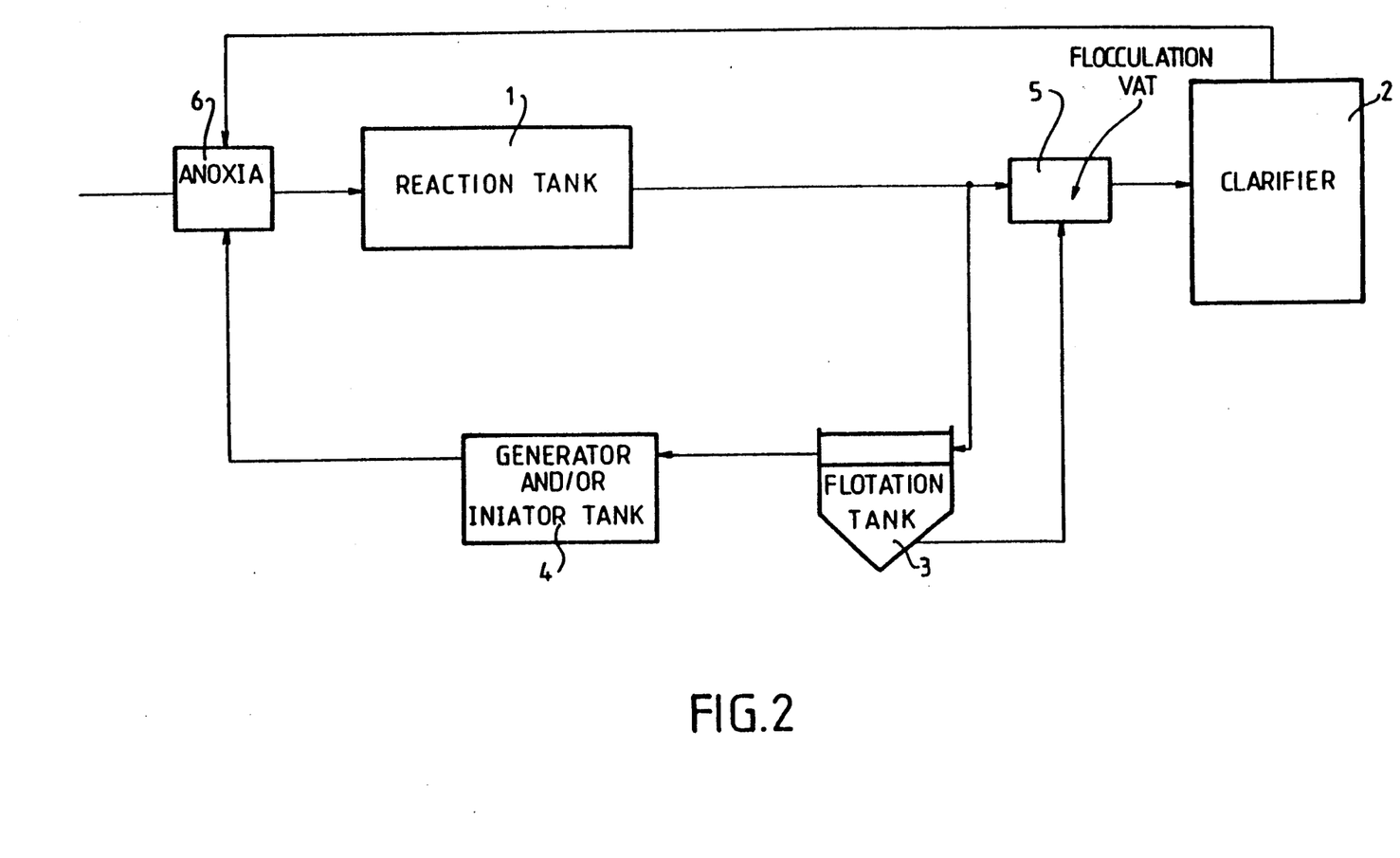
FIG. 2 is a diagram of a water purification station provided with apparatus in accordance with the invention for concentrating activated sludge in association with a nitrification zone and with a denitrification zone.

The generation tank, also known as the stabilization tank, is a tank in which the sludge ageing stage takes place.

The initiation tank is the tank in which the initiation stage of the reactions occurs, particularly dephosphatation, the these reactions being effectively realized in the reaction tank. The sole difference is the incorporation of an anoxia zone 6 at the inlet to the station for receiving both the sludge from the generator tank 4 operating in anaerobiosis and the sludge from the clarifier 2, prior to recycling the sludge. This anoxic zone serves to reduce nitrates into gaseous nitrogen, which reduction is performed in the absence of oxygen and in the presence of organic carbon in the water. In FIG. 2, raw water is directed to reaction tank 1 through an anoxic zone 6 at the inlet to the reaction tank.

Finally, for dephosphating (FIG. 3), the concentrated sludge from the flotation tank 3 is conveyed to an initiator tank 4 operating under strict anaerobic conditions in order to consume the oxygen in said sludge; thereafter the concentrated sludge is injected into a quantity of raw water to be treated in a tank 7 at the inlet to the station and operating under anaerobic conditions. The sludge which has settled in the clarifier is injected into the tank 7 in parallel, and thereafter the sludge is recycled to the contact tank 1.

The increase in the concentration of activated sludge prior to being recycled makes it possible to greatly reduce the aeration volumes required, in particular for the nitrification stage.

EXAMPLE 1

Comparison between a conventional water purification system and a system of the present invention.

It is possible to quantify the volume percentage saved in the reaction tank and the generator tank in comparison with a conventional water purification installation.

In most cases, the limiting stage, i.e. the stage governing volume, is the generation and/or initiation stage.

From the equation $V = APx/X$ it can be deduced that: which $$XV/Px = (XgVg + XrVr)/Px$$

which is equivalent to:

$$XV = XgVg + XrVr$$

whence:

$$V = Vg(Xg/X) + Vr(Xr/X)$$

Since the total volume of the water purification station is equal to $Vg + Vr$, it can be deduced that:

$$V\text{total} = V - \left[\frac{Xg - X}{X} Vg + \frac{Xr - X}{X} Vr\right]$$

Clearly, the greater Vg and Xg, the greater the volume saving in the water purification station.

The presents the swing due to the method of the present invention.

Since Xg depends on the concentration stage and Vg depends on the rate of biomass increase, the term:

$$Vg((Xg - X)/X) + Vr((Xr - X)/X)$$

corresponds to the saving due to the method of the present invention compared with the conventional method. By using the equations:

$$Vr = CQ/RXr, \text{ and } A = (XgVg + XrVr)/Px$$

the following may be written to define T:

$$T = APx\left[\frac{Xg - X}{Xg \cdot X}\right] - \frac{CQ}{RXr}\left[\frac{Xg - Xr}{Xg}\right]$$

from which the percentage volume saving (i.e. T/V) compared with the conventional method can be deduced. T is the volume saving in absolute value and T/V is the percentage volume saving.

$$\frac{T}{V} = \frac{R \times Xr \times A \times Px(Xg - X) -\ C \times Q \times X(Xg - Xr)}{R \times Xr \times A \times Px \times Xg}$$

For nitrification, the volume saving compared with the conventional method can be evaluated as follows using the example dimensions given above:

$$\frac{T}{V} = \frac{0.054 \times 6.1 \times 12.2 \times 1440(30-4) - \frac{400 \times 4(30-6.1)}{0.54 \times 6.1 \times 12.2 \times 1440 \times 30}}{} = 65\%$$

EXAMPLE 2

Volume savings in the aeration tanks of a water purification station as obtained by using a flotation tank to concentrate the sludge, and when using a nitrification stage.

1—The aeration volume required by the nitrogen-fixing microorganisms were compared between a conventional method and a method using a flotation tank (cf. Example 1).

The basic values selected for this experiment were as follows:
  throughput of raw water treated (Q): 10,000 m$^3$ per day;
  biological oxygen requirement (DBO): 2,000 kg per day;
  Natrium Titration Kalium (NTK): 473 kg per day;
  matter in suspension (MeS): 2,000 kg per day;
  minimum temperature: 13° C.; and
  no primary settling tank.

For nitrification at a temperature of 13° C., the required sludge age is 12.2 days.

Excess sludge production at a ratio of MeS/DBO=1, makes it possible to obtain 0.72 kg of MeS per kg, i.e. 1,440 kg per day.

2—With the conventional method using a sludge concentration of 4 g/l in aeration, the aeration volume obtained is 4,400 m$^3$.

3—With the method using a flotation tank, it is necessary to take account of the aeration volumes in the generator tank, in the aeration tank, and in the flotation tank.

The aeration tank is dimensioned solely as a function of nitrification kinetics.

Taking 6.1 g/l of MeS at 75% MV (volatile matter), the reaction may be established at: 3 mg fixed N—NH$_4$ per g of MVS per hour, i.e. 13.6 mg N—NH$_4$ per liter and per hour.

The quantity of nitrogen removed from the excess sludge is: 1,440×0.75×0.07=75.6 kg per day.

Assuming full nitrification, the quantity of nitrogen to be fixed is 473−75.6=400 kg per day, approximately.

The aeration volume required is calculated as 1,235 m$^3$.

The generator tank is dimensioned so as to obtain sludge of the required age.

It is assumed that excess sludge production is the same as in the conventional method, i.e. 1,440 kg per day.

The required mass of sludge is 17,570 kg; the mass of sludge required in aeration is equal to:

1,235×6.1=7,530 kg

It is therefore necessary for the mass of sludge being generated to be equal to 17,570−7,530, i.e. about 10,000 kg.

Since the concentration obtained in the sludge being generated is about 30 g/l, the generator volume required is equal to 10,000/30=330 m$^3$.

The total tank volume required is thus 1,235+330, which is 1,565 m$^3$. The saving in volume obtained by the method of the present invention compared with the conventional method is better than 64%; however account must also be taken of the fact that it is necessary to provide a flotation tank in addition.

The flotation area required is calculated as follows: by convention, the throughput through the flotation tank is equal to the raw water throughput, i.e. 10,000 m$^3$ per day with sludge at a concentration of 6.1 g/l. Assuming a skim rate of 6 kg per m$^2$ per hour, this corresponds to a flotation area of 10,000×6.1/(24×6)=416 m$^2$.

EXAMPLE 3

Volume savings in the aeration tanks of a water purification station as obtained by using a flotation tank to concentrate the sludge, and when using a nitrification stage associated with a denitrification stage.

1—The aeration volume required by the nitrogen-fixing microorganisms and for denitrification microorganisms were compared between a conventional method and a method using a flotation tank (cf. Example 1).

The basic values selected for this experiment were as follows:
  throughput of raw water treated (Q): 10,000 m$^3$ per day;
  biological oxygen requirement (DBO): 2,000 kg per day;
  Natrium Titration Kalium (NTK): 473 kg per day;
  matter in suspension (MeS): 2,000 kg per day;
  minimum temperature: 13° C.; and
  no primary settling tank.

For nitrification at a temperature of 13° C., the required sludge age is 12.2 days.

Excess sludge production at a ratio of MeS/DBO=1, makes it possible to obtain 0.72 kg of MeS per kg of DBO eliminated, i.e. 1,440 kg per day.

Nitrification takes place as in Example 2.
Denitrification takes place as follows:

2—With the conventional method using a sludge concentration of 4 g/l in aeration, the aeration volume obtained is 4,400 m$^3$.

The aeration tank is dimensioned solely as a function of nitrification kinetics.

Taking 4 g/l of MeS at 75% MV (volatile matter), the reaction may be established at: 3 mg fixed N—NO$_3$ per g of MVS per hour, i.e. 9 mg N—NO$_3$ per liter and per hour.

The quantity of nitrogen removed from the excess sludge is: 1,440×0.75×0.07=75.6 kg per day.

Assuming full nitrification, the quanity of nitrogen to be fixed is 473−75.6=400 kg per day, approximately.

The aeration volume required is calculated as 1,235 m$^3$.

The quantity of N—NO$_3$ to be denitrified, assuming 400% recycling relative to a quantity equal to 2Q, is 300 kg per day, which means that an inlet tank volume of 1,390 m$^3$ can be obtained.

3—With the method using a flotation tank, it is necessary to take account simultaneously of the aeration volumes in the generator tanks, in the aeration tanks, and in the flotation tank. Since the volume of the aeration tank is 1,235 m$^3$ and since the volume of the anoxia tank, calculated as before using 13.6 mg of N—NO$_3$ per liter and per hour is 920 m$^3$, the total volume of the tanks (using the same procedure as in Example 2) is thus 1,235+920+330 which is equal to 2,485 m$^3$.

The volume saving obtained by this method compared with conventional methods is better than 57%.

EXAMPLE 4

Volume saving in the aeration tanks of a water purification station as obtained using a flotation tank to concentrate the sludge, and when using a dephosphating stage.

1—In this example, the generator tank is under strictly anaerobic conditions. This tank is not involved in calculating the age of the sludge. However, as in the preceding example, this tank makes it possible to maintain a higher concentration of sludge in the aeration tank.

Assuming that the quantity of carbon genuinely decomposed ($CO_2$) in the anaerobic zone is low, the biological oxygen requirement DBO is 2,000 kg per day.

Assuming a DBO per unit mass >0.5 kg of biological oxygen per kg of MeS per day and using the same sludge concentration value as above, the aeration volume is:

$$2,000/(0.5 \times 6.1) = 655 \text{ m}^3$$

2—Calculation of the volume of the anaerobic aeration tank.

Using the method of the invention, the admission rate to the generator tank is 48 m³ per hour.

With a response time of four hours, the resulting volume for the anaerobic aeration tank is 190 m³.

3—Calculating the volume of the anaerobic aeration tank placed at the inlet to the water purification station.

Assuming a transit time of four hours (since the stabilization transit time has already sufficiently initiated the reaction for the transit time in this tank to be reduced and since the acetate producing reaction and PHB storage are not limiting) the resulting volume for the anaerobic aeration tank is 1,666 m³.

For a transit time of two hours under the same conditions, the corresponding anaerobic aeration volume is 835 m³.

The tank volume saving in the water purification station due to the method of the invention compared with conventional methods is about 37%.

EXAMPLE 5

Aeration tank volume saving in a water purification station as obtained by using a flotation tank to concentrate the sludge, and when using a nitrification stage and a dephosphating stage.

1—The same procedure is used as in the preceding examples.

In addition, as in Example 2, the nitrate concentration in the liquor leaving the aeration tank is about 40 mg/l, which concentration is identical in the aerobic stabilization tank.

2—With anaerobic stabilization, the nitrate is reduced by endogenous denitrification, with the speed of reduction lying in the following range: 0.6 to 0.8 mg of N—$NO_3$ per g of MVS per hour.

Given the sludge concentration in the stabilization tank (30 kg/m³) the nitrate is fully reduced after a transit time of about two hours, thereby enabling nitrate-free sludge to be returned to the anaerobic tank at the inlet to the water purification station.

3—A water purification station using the method of the invention thus has the following dimensions:
volume of the aeration tank: 1,235 m³;
volume of the aerobic stabilization tank: 330 m³;
volume of the anaerobic stabilization tank: 190 m³; and
volume of the anaerobiosis tank: 835 m³.

The saving in tank volume obtained in the water purification station by using the present method compared with conventional methods is about 57%.

EXAMPLE 6

Aeration tank volume saving in a water purification station as obtained when using a flotation tank to concentrate the sludge, and when using a nitrification stage associated with the denitrification stage and a dephosphating stage.

1—The same procedure is used as in the preceding examples.

2—The water purification station obtained using the present method has tanks of the following dimensions:
volume of the aeration tank: 1,235 m³;
volume of the anoxia tank: 920 m³;
volume of the aerated stabilization tank: 330 m³;
volume of the anaerobic stabilization tank: 190 m³;
volume of the anaerobiosis tank: 835 m³; and
total volume of the water purification station: 3,510 m³.

3—In comparison, conventional methods give the following dimensions for the tanks of the water purification station:
volume of the aeration tank: 4,400 m³;
volume of the anoxia tank: 1,390 m³;
volume of the anaerobiosis tank: 1,666 m³; and
total volume of the water purification station: 7,456 m³.

The saving in tank volume in the water purification station as provided by the present method compared with conventional methods is about 53%.

EXAMPLE 7

Advantages of using the method and the apparatus of the present invention.

As shown in the above examples, the aeration volumes of a water purification station are diminished by virtue of the activated sludge being concentrated in a flotation tank mounted in a loop between the aeration tank and the generator and/or initiator tank. Said flotation tank, in which the water is pressurized either directly or indirectly, is fed with activated sludge at a concentration of about 4 g/l to 5 g/l, thereby obtaining a capture rate for matter in suspension of about 85%. The concentrated sludge is then subjected to a generation stage, with the concentration of said sludge then being about 30 g/l to about 40 g/l.

By using a flotation tank in the loop, it is possible to triple or quadruple the biomass concentration, in particular relative to the "contact-stabilization" method used in the prior art, thereby obtaining considerable savings in aeration volume.

The invention is not limited to those implementations, embodiments, and applications which have been described explicitly; on the contrary, the invention extends to any variant that may occur to a person skilled in the art without going beyond the scope of the claims.

We claim:

1. A method for treating waste water for purification thereof in the presence of activated sludge comprising:
oxidizing said waste water under aerobic conditions:

nitrifying said water under aerobic conditions to produce a mixture of treated water and activated sludge;

flocculating said mixture;

separating said treated water and the activated sludge in a clarifier and directly recycling separated sludge to the untreated wastewater;

concentrating an excess portion of said treated water and activated sludge obtained when the capture rate of effluent during said separation step is less than 5-6 grams/liter, by flotation with compressed air;

removing supernatent concentrated sludge and subnatent effluent from said flotation step;

aging said concentrated sludge under aerobic conditions, recycling said aged sludge into the untreated wastewater to be purified and directing said subnatent to said flocculation step.

2. The method according to claim 1 wherein prior to nitrifying the wastewater, the wastewater is treated by dephosphation under strict anaerobic conditions.

3. The method according to claim 1 wherein, after the aging step, the sludge is further treated by initiation under conditions of strict anaerobiosis whereby any oxygen in said sludge is consumed.

4. The method according to claim 1 wherein, prior to said oxidation step, the waste water is treated by denitrification under anoxic conditions.

5. A method according to claim 1 wherein said concentrated and aged sludge is diluted by mixing said sludge with raw water under anoxic conditions whereby nitrates are reduced to gaseous nitrogen.

6. The method according to claim 1 wherein the concentrated and aged sludge is initiated under conditions of strict anaerobiosis and is then injected into a quantity of untreated wastewater and treated for dephosphation under strict anaerobic conditions prior to said nitrification step.

* * * * *